March 25, 1958  
G. B. HILL  
2,828,130  
CONVEYOR AND BEATER DRIVE MECHANISM  
FOR MANURE SPREADERS  
Filed June 24, 1955
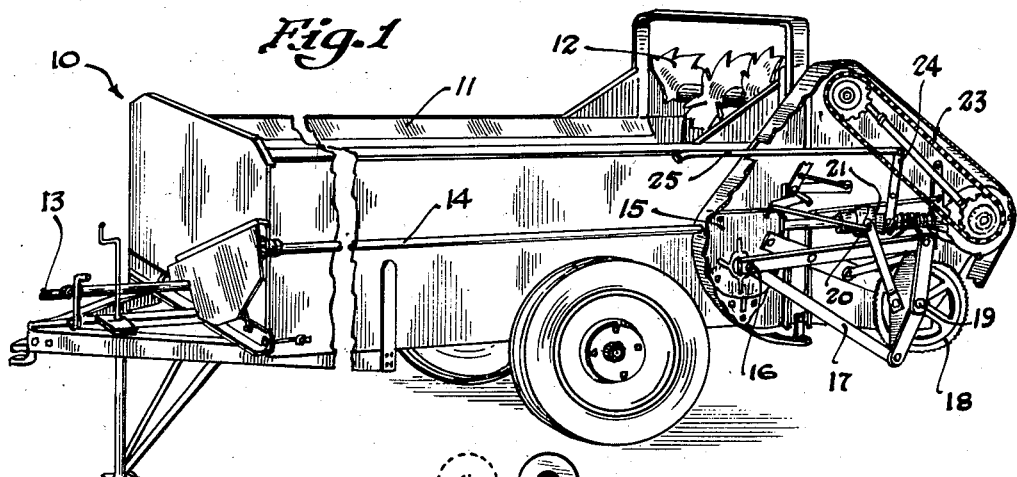
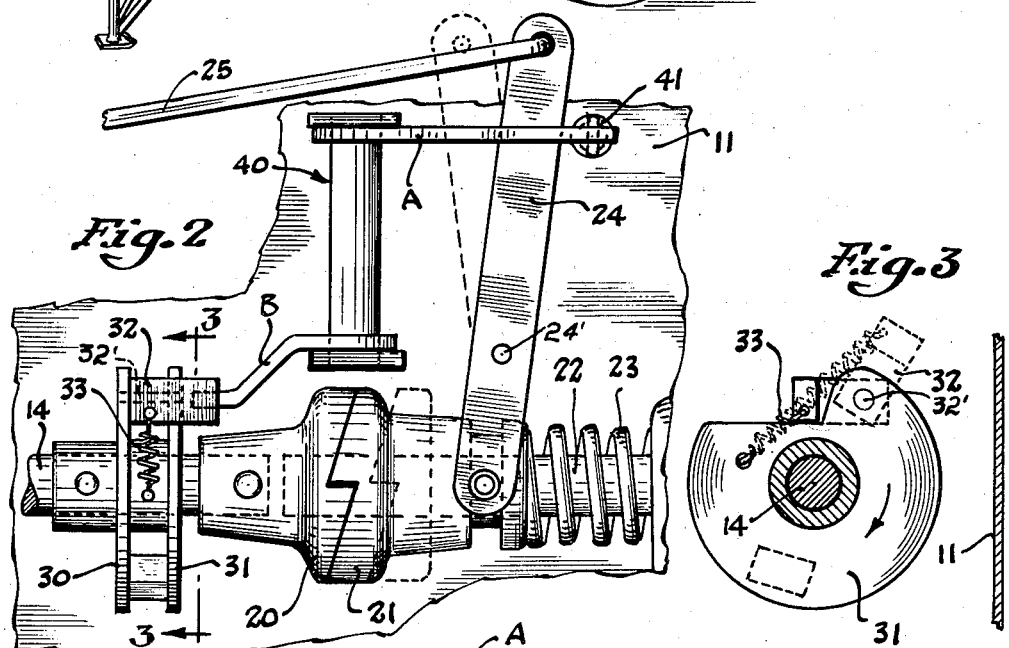
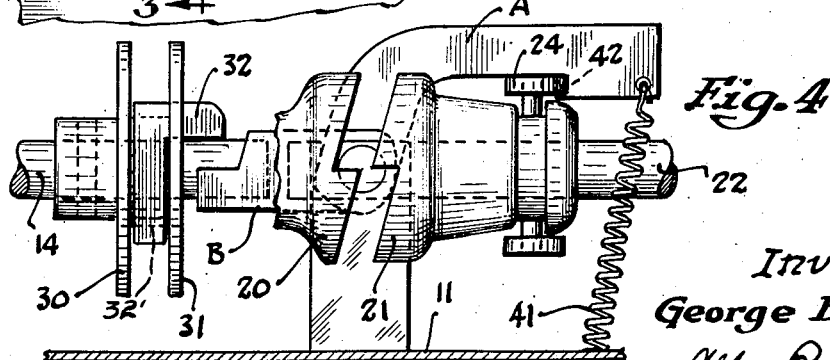
Inventor  
George B. Hill  
By Allan R. Redrow  
Attorney

United States Patent Office 2,828,130
Patented Mar. 25, 1958

2,828,130

CONVEYOR AND BEATER DRIVE MECHANISM FOR MANURE SPREADERS

George B. Hill, Celina, Ohio

Application June 24, 1955, Serial No. 517,741

6 Claims. (Cl. 275—5)

This invention relates to a beater drive for a manure spreader and more particularly to an improved semi-automatically operable clutch arrangement disposed between the conveyor drive and the beater drive means.

In the past, power take-off drives have been incorporated in manure spreaders for connecting the spreader to the tractor power take-off, and in such arrangements, clutch means have been provided to discontinue the beater drive while driving the conveyor in the body of the spreader to move the residual manure from the spreader. Thereafter when the spreader has been loaded with a fresh supply and the conveyor is started, it is essential that the clutch controlling the drive to the beater be re-engaged so that when the manure load is carried backwardly it is properly shredded and spread by the beaters. Since the manure tends to set up into a rather compact heavy mass upon being loaded into the spreader, it is essential that the beaters be driven so that the manure is shredded and distributed. As otherwise, if the mass of the manure is driven against the beaters while they are stationary, the beater mechanism is damaged by the heavy pressure caused by the conveyor driving the manure load backwardly.

It is the purpose of this invention to provide a clutch mechanism disposed between the conveyor drive means and the beater drive mechanism such that once the clutch has been disengaged, it is automatically re-engaged after the manure spreader has been brought to a standstill such as would be necessary in refilling the spreader.

To accomplish this object, a manually operable clutch operating means is provided for disengaging the clutch. A suitable latching means is provided to hold the clutch disengaged as long as the drive continues from the power take-off means, and additional means responsive to the motion of the power take-off drive are provided to subsequently trip the latch after the drive has been brought to a standstill. Thus, while the spreader is still in the field and after the load has been substantially discharged, the conveyor mechanism in the body of the spreader may be continued in operation to completely unload the spreader as it is pulled back across the field to receive a new load. Upon reaching the loading station, the conveyor drive is also discontinued and the spreader may then be loaded, but as soon as the conveyor drive has been stopped, a trigger mechanism is set to trip the latching means holding the beater clutch disengaged. As soon as the latching means is tripped, this beater clutch is re-engaged and the beater is driven simultaneously with the conveyor until its clutch is manually disengaged again. Thus it is seen, that with such means, it is impossible to load a spreader and accidentally drive the full load against a stationary beater mechanism in starting up the conveyor.

For a more complete description of this invention, reference may be had to the drawings and detailed description which follows:

Figure 1 is a side perspective of a conventional manure spreader with the drive mechanism cover partly broken away to show the power take-off drive for the conveyor and beater mechanisms;

Figure 2 is a fragmentary detailed side elevation showing the drive to the beaters through a clutch which may be manually disengaged and automatically re-engaged;

Figure 3 is a view taken on line 3—3 of Figure 2; and

Figure 4 is a bottom plan view of the mechanism shown in Figure 2, partly broken away.

Referring to Figure 1, the spreader 10 has a body 11, the bottom surface of which is provided with a cooperating conveyor mechanism (not shown) which is adapted to deliver the load of manure contained in the body rearwardly to be fed against the driven beaters 12. Suitable drive means for the conveyor and the beater mechanisms are provided and as here shown, such means include a drive shaft 13 adapted to be connected to the power take-off of a tractor, the shaft 13 serving to drive the shaft 14, the rear end of which is connected to a gear box and clutch for driving the conveyor and beater drive means.

The conveyor drive mechanism includes a housing 15 for enclosing a worm gear reduction drive means which is operative to drive crank 16 which in turn drives oscillating link 17 of a ratcheting mechanism 18. The ratchet wheel 18 is connected to a drive shaft 19 which carries the conveyor and the drive is operative to step the conveyor along in the body of the spreader to deliver the manure against the beaters 12.

To transmit a driving force to the beaters, the drive shaft 14 is continued through the gear box 15 and passes rearwardly along the side of the spreader body to be connected to the driving face 20 of the clutch, the driven face 21 of which is adapted to be slidably splined to drive shaft 22 leading to the beater drive means. A suitable spring 23 is provided to normally urge the face 21 into contact with the driving face 20 of the clutch and a clutch throwout lever 24 is provided which may be manually operated to turn about pivot shaft 24' by pulling on link 25 to effect disengagement of clutch face 21 from face 20. The drive shaft 22 is connected to a suitable gear and sprocket drive means 23 for driving the upper and lower beater elements.

The above described conveyor and the beater drive means are patterned after conventional spreader drive means. In normal operation, the shaft 14 through the ratcheting means drives the conveyor to carry the manure load against the beaters which are driven by sprocket drive means 23, whereby the manure is shredded and distributed over the ground. After substantially all of the load has been delivered from the body of the spreader, it is desirable to stop the unnecessary driving of the beater mechanisms so that the conveyor can be driven more easily to effect complete unloading of the residual manure in the body of the spreader prior to returning to the barn. To accomplish this, after the load has been delivered, the driven clutch face 21 is disengaged from driving face 20 so that the beater drive is discontinued while the conveyor drive through gear box 15 continues to operate. Upon returning to the barn, the spreader may be loaded again to return to the field or washed down to remove the corrosive chemicals present in manure.

In either case, when the spreader is filled and is ready for use again, it is possible with the mechanism above described, that the clutch for driving the beaters might be left disengaged in which case the manure load would be forceably driven rearwardly when the conveyor drive is started such that the beaters would be badly damaged because of the very great force imparted to the manure mass by the worm gear reduction and the leverage of the ratchet drive means. It is the purpose of the present invention however to include means for automatically effecting engagement of face 21 with face 20 upon again starting the drive to the conveyor means whereby to automatically eliminate any possibility of starting the conveyor drive while unintentionally leaving the beater drive disconnected.

The mechanism for accomplishing this result is best shown in Figures 2 and 3 wherein the drive shaft 14 leading from the power take-off is shown as having a pair of spaced flanges 30 and 31 fixed thereto, the flanges carrying an L-shaped dog 32 carried on a pivot 32' therebetween. The flanges are fixed to the shaft 14 closely adjacent the clutch driving face 20 of the beater clutch and a spring 33 is disposed between the flanges 30 and 31 to be connected to dog 32 with this construction. When shaft 14 is stationary, the spring 33 pulls the dog to the full line position shown in Figures 2 and 3. When the shaft 14 is rotating, however, the centrifugal action built up in the L-shaped dog 32 overpowers spring 33 and throws the dog outwardly to the dotted line position shown in Figure 3.

The shaft 14 as above described is adapted to be connected to the drive shaft 22 for the beater drive means 23 through the jaw clutch having faces 20 and 21 and which may be disengaged against the bias of spring 23, by means of lever 24. The driven clutch face 21 is withdrawn from engagement by moving the clutch throwout yoke 24 from the full line position shown in Figure 2 to the dotted line position there shown. In association with the clutch throwout lever 24, there is provided a latch mechanism having a pivotally mounted bell crank lever 40 which rotates about a generally vertical axis. Referring to Figure 4, the bell crank lever 40 is shown from the bottom with respect to Figure 2 and a spring 41 is provided for connection between the body 11 of the spreader and one of the arms of the bell crank lever for normally urging the bell crank lever 40 to rotate in a clockwise direction as there shown. When the clutch throwout lever 24 is pulled forwardly to the dotted line position to disengage the clutch for the beater drive, the lever 24 falls into a notch 42 provided in the upper arm A of the bell crank lever. The spring 41 snaps the bell crank upper arm A in behind lever 24 to hold the clutch face 21 disengaged, which condition will prevail until the clutch lever is released from engagement behind notch 42. As long as the drive shaft 14 continues to rotate, the L-shaped dog is slung outwardly by centrifugal force, and the bell crank lever 40 functions as a latch to hold lever 24 in the dotted line position indicated in Figure 2. As soon as the shaft 14 is allowed to come to rest, however, the dog 32 is drawn inwardly to the full line position shown in Figure 3 by its spring 33 so that when shaft 14 again starts to rotate, the outer or exposed end of the L-shaped dog will engage the lower arm B of the bell crank lever 40 to rotate the bell crank about its axis to withdraw upper arm A carrying notch 42 from engagement behind clutch lever 24 whereby to inactivate the holding arm A. As soon as the notch 42 passes from behind the lever 24, clutch spring 23 drives the clutch face 21 into engagement with clutch face 20 whereby to engage the clutch and re-establish the drive through to the beater mechanism and return the clutch lever to the full line position shown in Figure 3.

In use, the mechanism described above provides a means which will permit the drive to the beater mechanism to be disconnected from the power take-off drive connection while at the same time the drive to the conveyor in the body of the spreader is continued to clean out the last portions of the manure after unloading the spreader. As soon as the shaft 14 is stopped, however, as is necessary during the filling of the spreader, and upon re-establishing a drive to the conveyor mechanism, the beater drive is automatically re-established by reason of dog 32 kicking the latch 42 from behind lever 24 whereby to eliminate any chance of damaging the beaters by failure to start the beaters or shredders when a full load is first delivered rearwardly. If for some reason it is intentionally desired that the beaters should not be run at this time, the operator can again disengage the beater drive while continuing the conveyor drive by engaging the throwout lever 24 behind the notch 42 in the bell crank latching mechanism.

It is obvious that many forms of motion responsive tripping devices could be incorporated in a clutch tripping device to effect re-engagement of the beater drive clutch upon starting the drive again. Therefore, while the above description discloses the preferred form of the invention, it is obvious that many modifications thereof may occur to those skilled in the art which may fall within the scope of the following claims.

I claim:

1. A manure spreader adapted to be driven from a power take-off of a tractor, said spreader having a body with a conveyor therein and beaters, means to drive both said conveyor and beaters, comprising a drive shaft adapted to be connected to said power take-off, means connected to said drive shaft to transmit motion to said conveyor, means connected to said drive shaft to transmit motion to said beaters, said last named means including a clutch, means normally urging said clutch into engagement, means to disengage said clutch, means cooperating with said disengaging means to hold said clutch disengaged, and means responsive to the speed of rotation of said drive shaft after the drive shaft has been stopped and started again for cooperating with said holding means to act upon said holding means to nullify said cooperation and permit said urging means to effect engagement of said clutch.

2. A manure spreader adapted to be driven from a power take-off of a tractor, said spreader having a body with a conveyor therein and beaters, means to drive both said conveyor and beaters, comprising a drive shaft adapted to be connected to said power take-off, means connected to said drive shaft to transmit motion to said conveyor, means connected to said drive shaft to transmit motion to said beaters, said last named means including a clutch, a spring normally urging said clutch into engagement, a lever movable from one position to another against the urge of said spring to disengage said clutch, means to hold said lever in said other position, and means responsive to the speed of rotation of said drive shaft after the shaft has been stopped and started again to release the hold of said holding means on said lever to permit said spring to effect engagement of said clutch and return said lever to said one position.

3. A manure spreader adapted to be driven from a power take-off of a tractor, said spreader having a body with a conveyor therein and beaters, means to drive both said conveyor and beaters, comprising a drive shaft adapted to be connected to said power take-off, means connected to said drive shaft to transmit motion to said conveyor, means connected to said drive shaft to transmit motion to said beaters, said last named means including a jaw clutch, a clutch springs normally biasing the jaws of said clutch toward engagement, a lever for disengaging the jaws of said clutch, means for operating said lever to disengage the clutch, a bell crank having two arms, one of said arms having a latch to engage said lever to hold the clutch disengaged against the tension of said clutch spring, means biasing said one arm to latching position, movable means on said drive shaft responsive to the speed of rotation thereof and positioned when the shaft is substantially at rest to engage the other arm of said bell crank to drive the bell crank in a direction to move said one latching arm to the unlatched position, said movable means being positioned in an out of engagement position relative to said other arm by the rotation of said drive shaft but moving to a position to engage said other arm when said drive shaft ceases to rotate whereby it will engage said other arm immediately upon the restarting of rotation of said drive shaft.

4. A manure spreader adapted to be driven from a power take-off of a tractor, said spreader having a body with a conveyor therein and beaters, means to drive both said conveyor and beaters, comprising a drive shaft adapted to be connected to said power take-off, means connected to said drive shaft to transmit motion to said conveyor, means connected to said drive shaft to transmit motion to said beaters, said last named means including a jaw clutch, a clutch spring normally biasing the jaws of said clutch toward engagement, a lever for disengaging the jaws of said clutch, means for operating said lever to disengage the clutch, a bell crank having two arms, one of said arms having a latch to engage said lever to hold the clutch disengaged against the tension of said clutch spring, means biasing said one arm to latching position, a pivotally mounted dog on said drive shaft and eccentrically disposed thereon to be responsive to the speed of rotation thereof said dog having a free end positioned when the shaft is substantially at rest to engage the other arm of said bell crank to drive the bell crank in a direction to move said one latching arm to the unlatched position, said dog being situated in an out of engagement position relative to said other arm by the rotation of said drive shaft but moving to a position to engage said other arm when said drive shaft ceases to rotate whereby it will engage said other arm immediately upon the restarting of rotation of said drive shaft.

5. A manure spreader adapted to be driven from a power take-off of a tractor, said spreader having a body with a conveyor therein and beaters, means to drive both said conveyor and beaters, comprising a drive shaft adapted to be connected to said power take-off, means connected to said drive shaft to transmit motion to said conveyor, means connected to said drive shaft to transmit motion to said beaters, said last named means including a jaw clutch, a clutch spring normally biasing the jaws of said clutch toward engagement, a lever for disengaging the jaws of said clutch, means for operating said lever to disengage the clutch, a bell crank having two arms, one of said arms having a latch to engage said lever to hold the clutch disengaged against the tension of said clutch spring, means biasing said one arm to latching position, a pair of spaced flanges on said drive shaft, a dog pivotally mounted between said flanges to be responsive to the speed of rotation thereof and positioned when said shaft is substantially at rest to engage the other arm of said bell crank to drive the bell crank in a direction to move said one latching arm to the unlatching position, a spring means biasing said dog inwardly but said dog being responsive to centrifugal force to be thrown outwardly thereby, said dog being thrown outwardly to an out of engagement position relative to said other arm by the rotation of said drive shaft but being biased inwardly to a position to engage said other arm of the bell crank when said drive shaft ceases to rotate whereby it will engage said other arm immediately upon the restarting of rotation of said drive shaft.

6. A drive mechanism for a manure spreader having a conveyor and beater means comprising a drive means for the conveyor and beater means, said drive means including a drive shaft and connected elements to operate said conveyor means, a continuation of said shaft for driving said beater means, a clutch means in said continuation of said shaft, means for urging said clutch into engagement, manually movable means for disengaging said clutch, holding means for engaging with said disengaging means to hold said disengaging means in clutch disengaged position after said manual disengaging means has been operated to discontinue the drive through the clutch to the beaters, and automatically operated means responsive to the initiation of motion in said drive shaft release the engagement between said holding means and said disengaging means, said automatic means including a centrifugally responsive means to coact with said holding means to effect said release, said coaction being such that the disengaging means may be manually set to be engaged by said holding means whereby to hold said clutch disengaged but after said centrifugally responsive means has come to rest and is started in motion again, the holding means is acted upon to release said disengaging means to permit said urging means to effect engagement of said clutch.

References Cited in the file of this patent

UNITED STATES PATENTS

| | | |
|---|---|---|
| 1,452,139 | Bailey | Apr. 17, 1923 |
| 2,597,052 | Barker | May 20, 1952 |